United States Patent [19]
Murphy

[11] 3,748,474
[45] July 24, 1973

[54] METHOD OF LOGGING A SUB-SURFACE FORMATION

[75] Inventor: Robert P. Murphy, Tulsa, Okla.

[73] Assignee: Amoco Production Co., Tulsa, Okla.

[22] Filed: Dec. 27, 1971

[21] Appl. No.: 212,513

[52] U.S. Cl. .................. 250/83.3 R, 250/83.6 W
[51] Int. Cl. .............................................. G01t 1/18
[58] Field of Search .................. 250/83.3, 83.6 W

[56] References Cited
UNITED STATES PATENTS

| | | | |
|---|---|---|---|
| 2,480,674 | 8/1949 | Russell | 250/83.6 W |
| 3,562,523 | 2/1971 | Richardson | 250/83.3 |
| 3,631,245 | 12/1971 | Jorden | 250/83.6 W |
| 3,509,342 | 4/1970 | Dewan | 250/83.6 W |

*Primary Examiner*—James W. Lawrence
*Assistant Examiner*—Harold A. Dixon
*Attorney*—Paul F. Hawley and John D. Gassett et al.

[57] ABSTRACT

This invention relates to determining the oil saturation in an underground rock reservoir by use of a log-inject-log-inject-log technique. Thermal neutron decay time logs are taken in the native state, after fresh water injection and again after an alcohol injection followed by formation type water. These logs are used in an equation to determine oil saturation without need of knowledge of porosity or thermal neutron capture cross section of the formation rock.

7 Claims, 1 Drawing Figure

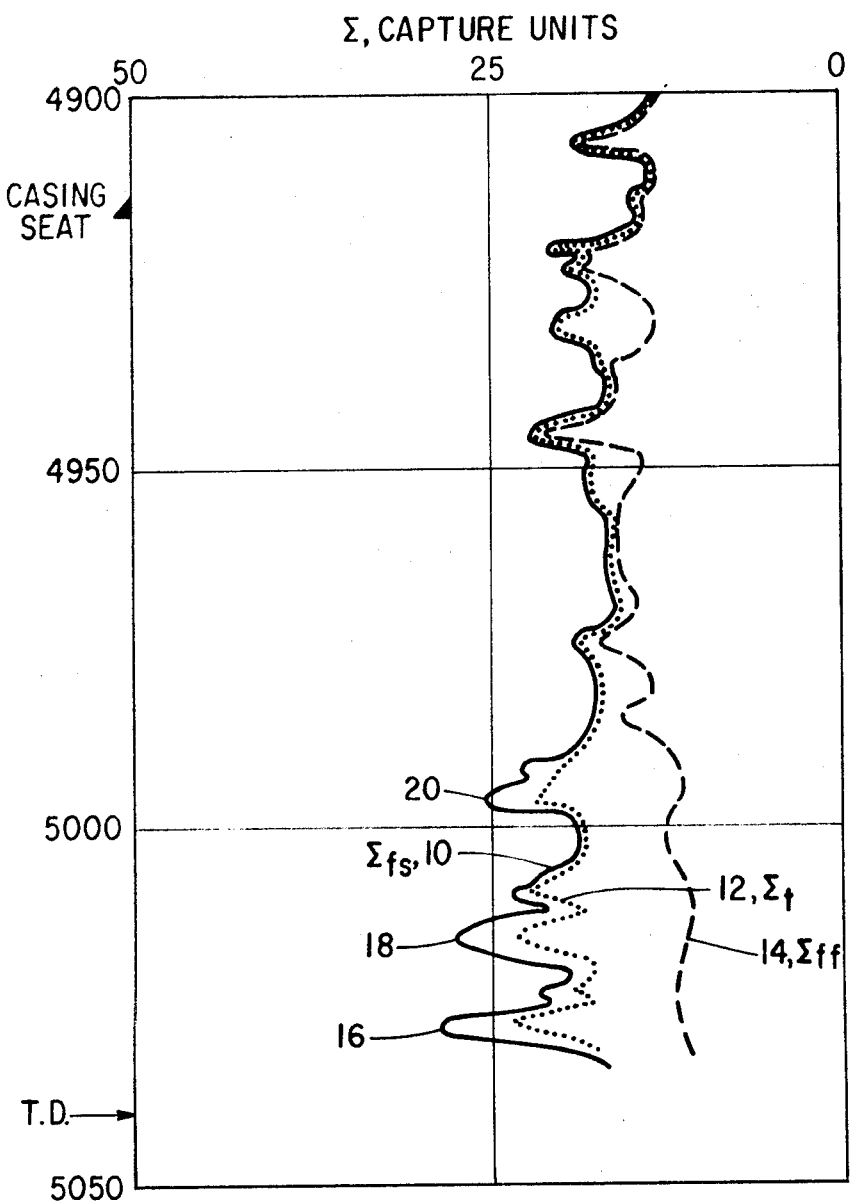

METHOD OF LOGGING A SUB-SURFACE FORMATION

CROSS REFERENCE TO RELATED APPLICATION

A closely related application is co-pending application Ser. No. 161,342 entitled "A Well Logging System" filed July 9, 1971, Robert P. Murphy, William W. Owens and Dwight L. Dauben.

BACKGROUND OF THE INVENTION

This invention relates to a method of logging a subsurface formation penetrated by a well bore to determine oil saturation.

SETTING OF THE INVENTION

Conventional Log Analyses

In the planning or engineering of the production of oil from an underground formation, it is most important to know the amount of oil in place. The oil in such underground reservoirs is contained in the pores of the rock. However, these pores contain more than oil. It is known that all such pores also contain some water, commonly called connate or formation water. Quite frequently these pores also contain gas.

There are ways of determining the percent of rock volume which is pore space. One such way is to cut a core, which typically is a cylindrical piece of the rock which is 2 to 3 inches in diameter and usually 20 to 30 feet at a time. After recovery of the core to the surface its porosity is determined. However, the knowledge of the porosity of the rock does not give a complete knowledge of the amount of oil in the rock. One must still determine what part of the core pore space is filled with water, what part with oil, and what part with gas. One can measure the quantities of gas, oil, and water in the core that has been brought to the surface and determine the water, oil, and gas saturations in the core. However, experience has shown that the fluid content of the core at the surface is seldom the same as was the fluid content of the core in its natural condition in the reservoir. There are several reasons for this. One is that when any drilling operation takes place in a borehole, and this includes cutting of cores, there is always fluid in the well bore. This fluid is usually what is referred to as a drilling mud. The drilling fluid, whether oil base or water base, usually causes some contamination of the core which is cut by invasion of the core by mud filtrate. If the core is cut using conventional or rubber sleeve core barrels, by the time it reaches the surface, the expansion of gas in the pore space and that which is liberated from oil upon removal of pressure, drives fluid from the core. There have been attempts made to overcome this problem. The most notable example is the use of a pressure core barrel. A pressure core barrel is merely a device inserted in the drill string near the bit. As the core is cut it is received into the core barrel. After the core is cut and is being held in the core barrel, valves are closed so that the core is completely sealed within the barrel. The sealed barrel is then raised to the surface and measurements are then made of the fluid content of the core. This system gives improved results but is quite expensive.

There are no logging devices available that can measure formation oil saturation directly. By formation oil saturation we mean that percent of the fluid in the pore space of the reservoir rock that is oil. There are devices, however, which can provide a measure of the water saturation. (It should be noted, however, that experience has shown that water saturations can only be computed from these logging devices with an accuracy of ±15 percent. If a gas saturation exists, it can be measured by an independent method such as described in U.S. Pat. No. 3,282,095. The oil saturation can then be computed by a difference of the pore space of the rock not filled with water or gas. It should be noted that undergound oil reservoirs which have been waterflooded normally contains no gas.

There are logs available for determining water saturations in wells which are cased. These are the thermal neutron decay time logs. The equation used in this interpretation is the equation (1) given below:

Thermal Decay Time Log $$S_w = (\Sigma_t - \Sigma_r)/\phi(\Sigma_w - \Sigma_{hc}) + (\Sigma_r - \Sigma_{hc})/(\Sigma_w - \Sigma_{hc})$$

1.

where $\Sigma_t$ = thermal neutron capture cross section of formation as measured by log.

$\Sigma_w$ = thermal neutron capture cross section of formation water. Can be predicted from chemical analysis of water.

$\Sigma_r$ = thermal neutron capture cross section of rock matrix. Is assumed from knowledge of lithology.

$\Sigma_{hc}$ = thermal neutron capture cross section of formation hydrocarbons. Estimated from oil gravity and formation pressure and temperature.

$\phi$ = porosity, fraction of bulk volume. Determined from core data and/or porosity logs.

As can be seen from a study of equation (1), a number of different formation parameters must be known quite accurately to provide a reliable measure of the formation water saturations.

PRIOR ART

The closest known prior art to this invention is U.S. Pat. No. 3,562,523 issued Feb. 9, 1971, in the name of Jasper E. Richardson and Richard E. Wyman. As stated in that patent and known in the art there are logging tools available for measuring the decay rate of thermal neutrons. Such a logging tool measures a quantity related to the total capture cross section of the formation plus the fluids contained in the formation. This measurement can be expressed as $$\Sigma_t = 1/v\Delta t \cdot \ln (N_1/N_2)$$

2.

wherein $\Sigma_t$ equals the total capture cross section, $v$ equals the velocity of thermal neutrons, $\Delta t$ equals the time between two measurements, and $N_1$ and $N_2$ equal the total counts, or counting rates, recorded by the logging tool during first and second measurements. Each counting rate is the number of pulses per unit time that are due to arrivals of gamma rays at a detector in the tool. The counting rate decays at the same rate as the capture gamma rays which, in turn, decay at the same rate as the thermal neutrons from which they are produced.

The total capture cross section can also be expressed as $$\Sigma_t = \Sigma_r (1-\phi) + \Sigma_w \phi A Q S_w + \Sigma_{hc}(1-S_w)\phi$$

3.

wherein $\Sigma_r$ equals the capture cross section of the formation rock, $\phi$ equals the porosity of the formation expressed as a fraction, $\Sigma_w$ equals the capture cross section of the water contained in the formation, $S_w$ equals the fraction of the pore volume containing water, and $\Sigma_{hc}$ equals the capture cross section of the hydrocarbon.

In the Richardson et al patent the logging tool is first operated to measure the thermal neutron decay with water and residual oil filling the pores of the rock. The first aqueous liquid is then displaced, without displacing any oil, by a second aqueous liquid having a materially different capture cross section. The second liquid can be an aqueous solution of higher, or lower, salinity than that of the first aqueous liquid. For example, if a formation water has a salinity of about 35,000 ppm of NaCl, it can be displaced by an aqueous liquid containing 200,000 ppm of NaCl, which will change the capture cross section of the water by an appreciable amount. The first aqueous liquid is displaced by the second at least throughout a zone that exceeds the lateral depth of investigation of the logging tool. In normal cases a displacement extending 2 to 3 feet from the borehole wall is sufficient. After the first aqueous liquid has been displaced, the log is again run and a new value of thermal neutron decay obtained. This provides the data for two simultaneous equations in which only one independent variable has been changed. The two simultaneous equations can be solved for the product of the two terms $\phi$ and $S_w$ without the necessity of assigning a value for the capture cross section of the formation rock or of the hydrocarbon.

The Richardson et al. patent requires that the oil concentration in the formation be at least as low as a water flood residual oil saturation. The present invention as will be seen discloses a sequence of injection and log techniques not contemplated in the Richardson et al. patent with one result being that the present system is not limited to those situations in which the oil concentration is at least as low as the waterflood residual oil saturation.

BRIEF DESCRIPTION OF THE INVENTION

As will be shown later I have developed the following equation (for those formations not containing a gas saturation) for determining formation oil saturation.

$$S_o = (\Sigma_{fs} - \Sigma_t)/(\Sigma_{fs} - \Sigma_{ff})$$

4.

where
$S_o$ = formation oil saturation, fraction of pore space.
$\Sigma_{fs}$ = thermal neutron capture cross section of formation after injecting an alcohol or micellar solution followed by formation salt water or after injecting a chlorinated hydrocarbon, log measurement.
$\Sigma_t$ = thermal neutron capture cross section of formation, log measurement.
$\Sigma_{ff}$ = thermal neutron capture cross section of formation after injecting fresh water having the same thermal neutron capture cross section as the formation hydrocarbon, a log measurement. (I will later show a system where it is not necessary to match the thermal neutron capture cross sections of the fresh water and the formation hydrocarbon).

In my method I especially prepare the formation so that I can obtain logs representing the terms $\Sigma_{fs}$, $\Sigma_t$ and $\Sigma_{ff}$ and then use them in equation (1).

BRIEF DESCRIPTION OF DRAWING

The drawing shows portions of three logs obtained in accordance with my invention and how they can be used to indicate permeability variations at different depth intervals for the injected fluid.

DETAILED DESCRIPTION OF THE INVENTION

It is believed best to first describe how equation (4) is obtained. After that I will then show how each term in that equation is obtained by proper preparation of the well and logging procedures. For the purpose of this description it is assumed that there is no gas saturation in the formation. I shall later teach what to do if there is gas saturation.

The factor most difficult to derive for solving of equation (1) is $\Sigma_r$. There are known ways to compute the formation water saturation without a knowledge of $\Sigma_r$. With this procedure the thermal neutron decay time log is obtained when the water in the pore space is a fresh water and has a thermal neutron capture cross section nearly equal to that of the formation hydrocarbons. The equation used to compute the thermal neutron capture cross section of the rock matrix is $$\Sigma_r = (\Sigma_{ff} - \phi \Sigma_{hc})/(1 - \phi)$$

5.

The usual procedure is to log the well in its true or native state and again after fresh water has been injected into the formation. This can be called log-inject-log procedure. The equation used to compute the formation water saturation from this log-inject-log procedure by combining equations (1) and (5) is $$S_w = (\Sigma_t - \Sigma_{ff})/\phi(\Sigma_w - \Sigma_{hc})$$

6.

If the pore space in the vicinity of the well is filled with salt water, or what appears to be salt water, to the thermal neutron decay time logging device I can obtain another base log for the formation. The equation derived for calculating the formation water saturation with this procedure is $$S_w = 1 - [(\Sigma_{fs} - \Sigma_t)/\phi(\Sigma_w - \Sigma_{hc})]$$

7

This equation was developed in said application Ser. No. 161,342.

By combining equations (6) and (7) I can obtain the following equation (8).

$$S_w = 1 - [(\Sigma_{fs} - \Sigma_t)/(\Sigma_{fs} - \Sigma_{ff})]$$

8.

It will be noted that the terms $\Sigma_r$ and $\phi$ have been eliminated. It is no longer necessary to determine or estimate them with my method.

Since it has been assumed that the formation does not contain a gas saturation, the equation 8 can be rewritten as equation 4 above to show the oil saturation.

I will now describe injection and logging procedures so that all of the terms in equation 8 can be obtained from the thermal neutron decay time logs. This can probably be done best by describing preferred steps for obtaining such logs.

STEP I

The initial step is the conditioning of the well to produce as near as possible the same gas, oil, and water saturation adjacent the bore as that present in the rock formation remote from the well bore. All well logging techniques currently known measure physical properties of the rock formations and the fluid contents immediately adjacent the bore. This is some variation in effective depth of investigation, but at best this is only a few feet. On the other hand, it is well known to reservoir engineers that the relative content of gas, oil and formation water a considerable distance from the bore is frequently quite different from the near the bore. There are various reasons for this. For example, high production rates which usually result in a high pressure gradient between the well bore and the inner well area, frequently causes water or gas coning or gas liberation which alters the fluid saturation distribution of the formation near the well bore. As a different example, if a new well is drilled into a partly depleted formation, or if coring is carried out in an old well, the presence of the drilling fluid may introduce changes in saturations near the bore as compared to deeper in the formation. Thus, for example, if water or oil base mud is used in the drilling or coring, the filtrate will, depending upon the nature of the filtrate, cause too high a water or oil saturation in the core. Thus it is clear that it is desirable before commencing the logging operation to restore the formation as nearly as possible to steady-state conditions.

In general, we can usually condition the formation adjacent the well bore by controlled production. We produce the well at a very slow rate so as to have a small pressure drop between the well bore and the formation remote from the well. This permits the liquids present in the reservoir formation immediately adjacent the bore to approximate the saturations prevailing a considerable distance from the well bore in the reservoir rock. Thus the relative fluid content of the reservoir rock adjacent the well bore approaches the steady-state condition which exists in most of the reservoir.

One satisfactory initial step in a partly depleted reservoir having a known gas saturation greater than 20 to 30 percent pore space, if economics do not rule it out, is to drill a new well into a reservoir using gas under pressure as a drilling fluid. We have found that under these conditions the liquid saturations in the rock immediately surrounding the well bore are usually very little affected by the drilling operations.

Step I teaches to condition the well to produce as near as possible the same gas, oil and water saturation adjacent the bore as that present in the rock formation remote from the well bore. This step is essential whether gas saturation exists or not. However, it is to be noted that the overall procedure of this invention is slightly different for those situations where gas saturation exists and those where it does not. In continuing the explanation of our invention and particularly involving Steps II through V, it will first be assumed that no gas saturation exists in the rock pore space. We will later describe a process for dealing with those situations in which gas saturation does occur.

STEP II

I next run a thermal neutron decay device in the well bore to obtain a base log so that I can obtain the term $\Sigma_t$. I caution here that I must know the salinity of the water in the formation. One would ordinarily know the salinity of the formation water as this can be readily determined from the sample of produced water. However, if the field or reservoir has been water-flooded with the water of different salinity from that originally in the formation, I should proceed this Step II by injecting a salt water of known salinity into the zone of interest before running this base log.

STEP III

I next inject fresh water to displace the salt water at least 2 feet back from the well bore. The neutron capture cross section of the fresh water should match that of the formation oil. (I later show here how I can use fresh water having a neutron capture cross section different from the formation oil).

STEP IV

A log whose response is $\Sigma_{ff}$ is now obtained. This is obtained by running the same tool at the same settings as was run in Step II.

STEP V

I now wish to displace all the oil from adjacent the well bore. This is done by injecting an alcohol or a micellar solution to displace all oil adjacent the well bore, e.g., at least about 2 feet. What I want to do is to reduce the oil saturation to zero in the volume of rock investigated.

Injection of solvent followed by alcohol is one process by which the oil saturation can be removed. The lead solvent should be a low molecular weight hydrocarbon, preferably containing some aromatics. Suitable solvents include condensates, light gasolines, and aromatic cut solvents such as reformate or ultraformate. The composition of the solvent is designed for a twofold purpose: (1) to be effective in dissolving organic deposits, and (2) to provide te proper phase relationships to permit efficient displacement of the solvent and alcohol by the drive water. It is recognized that direct contact of alcohols with some crude oils can cause asphaltene precipitation, particularly in low API gravity crudes.

Injection of a micellar solution followed by water can also reduce the residual oil saturation to a zero level. Micellar solutions suitable for this invention are composed of a hydrocarbon, water, petroleum or synthetic sulfonate surfactant, and an alcohol co-surfactant. A preferred composition is sold commercially by Amoco Chemical Company of Houston, Texas as Amoco Wellaid 220 micellar concentrate (water-free components). The micellar solution may be prepared by mixing together a locally available fresh water with added sodium chloride and the micellar concentrate. A 50 percent water (containing 9,000 ppm added NaCl) micellar solution is believed to be adequate for most applications. Where the matrix permeability is very low (e.g., <10 md) it may be desirable to inject ahead of and behind the 50 percent slug one or more higher water "buffer" micellar solutions. This procedure avoids any permeability reductions that might otherwise occur while injecting a single slug. In most low permeability applications a single 80 percent buffer slug will be sufficient. Other micellar solutions suitable for the practice of this invention are "Cleansweep" solutions sold by Dowell Division of the Dow Chemical Company, 1579 East 21st Street, Tulsa, Okla. 74114.

Micellar solutions are preferred to alcohols for this invention because of their lower unit cost and greater efficiency in displacing oil. The micellar solutions also by virtue of their higher viscosity (22 cp compared to 2 cp at room temperature) invade more of the tighter portions of the reservoir rock than do alcohols.

If formation water is saline, it may be necessary to precede the alcohol or micellar injection with fresh water to displace the salt water for protection. A micellar slug can emulsify upon contact with a high salinity water. An alcohol can precipitate salts upon contact with a high salinity water.

STEP VI

The next step is to displace the alcohol or the driving fluid used in Step V with formation water or water whose salinity is the same as formation water.

STEP VII

In this step I obtain $\Sigma_{fs}$. What I do is to run the log as in Steps II and IV.

These values of the log response obtained in Steps II, IV and VII are used in equation (4) to obtain the oil saturation. It is seen that I do not need to know the porosity measurement nor do I need to know the neutron capture cross section of the formation rock. It is necessary, however, to have a knowledge of the capture cross section of the formation oil and the formation salt water so that the neutron capture cross section of the injected fresh water and salt water can be duplicated. These capture cross section values can be determined from a knowledge of the oil gravity, gas oil ratio, formation pressure and temperature for the formation oil and from a mineral analyses of the produced formation water.

Each of the logs of Steps II, IV and VII can be run a number of times and the responses averaged cancelling the effects of any statistical variations in the response which may occur. The average capture cross section is determined for each interval of interest and the oil saturation for that interval is determined.

Alternate method in which the injected fresh water used in Step III has capture cross section different from formation oil In the particular method just described, the neutron capture cross section of the fresh water injected in Step III was the same as that of the formation oil. This may sometimes be difficult to do. The water which may be available in adequate amounts may have a considerably different cross section. I will now explain a procedure in which water having a significantly different capture cross section can be used. I will show how a suitable equation is obtained. Equation 6 is rewritten so that the term $\Sigma_{hc}$ is replaced by the term $\Sigma_{wf}$ (thermal neutron capture cross section of relatively fresh injected water which may or may not match that of the formation oil) and I obtain equation 9.

$$S_w = (\Sigma_t - \Sigma_{ff})/\phi(\Sigma_w - \Sigma_{wf}) \qquad 9.$$

By combining Equations 7 and 9 we obtain Equation 10.

$$S_w = (\Sigma_t - \Sigma_{ff})(\Sigma_w - \Sigma_{hc})/[(\Sigma_t - \Sigma_{ff})(\Sigma_w - \Sigma_{hc}) + (\Sigma_w - \Sigma_{wf})(\Sigma_{fs} - \Sigma_t)] \qquad 10.$$

Each term in equation (10) can be obtained as taught above.

If Rock Formation Contains Gas

If it is known or suspected that the pore volume being investigated contains gas, the saturation of the gas must be determined. A suitable method is described in U.S. Pat. No. 3,282,095. I modify the above procedure set forth in Steps I through VII by obtaining a measure of gas saturation ($S_g$) following the method of that patent after Step II. It is to be noted that in my method in Step III, I inject fresh water which has the same capture cross section as does the oil in the reservoir. Thus my Step III can be substituted for Step III for example of claim 1 of said U.S. Pat. No. 3,282,095 which calls for injecting a hydrogen containing liquid.

I shall now show how this determination of $S_g$ is used in my system. The thermal neutron log run in Step II can be expressed by the following equation:

$$\Sigma_t = (1-\phi)\Sigma_r + S_w \Sigma_w \phi + S_g \Sigma_g \phi + (1 - S_w - S_g)\phi\Sigma_{hc} \qquad 11.$$

where $S_g$ = Gas Saturation
$\Sigma_g$ = Gas neutron capture cross section which can be obtained from the literature for methane gas at reservoir temperature and pressure.

Solving equation (11) for $S_w$ we get equation (12).

$$S_w = [\Sigma_t - \Sigma_r + \phi(\Sigma_r - \Sigma_{hc} + \Sigma_{hc}S_g - S_g \Sigma_g)]/\phi(\Sigma_w - \Sigma_{hc}) \qquad 12.$$

Substituting the equality of $\Sigma_r$ of equation (5) into equation (12) I solve and obtain equation (13) which is the saturation of water in the reservoir rock.

$$S_w = [\Sigma_t - \Sigma_{ff} + \phi(\Sigma_{hc} S_g - \Sigma_g S_g)]/\phi(\Sigma_w - \Sigma_{hc}) \qquad 13.$$

I obtained the terms in the equation as follows.

$\Sigma_t$ is obtained in Step II.
$\Sigma_{ff}$ is obtained in Step IV.
$\Sigma_g$ is obtained from literature for methane gas at reservoir temperature and pressure.
$\Sigma_{hc}$ is estimated as shown in discussion of equation (1).
$S_g$ is as described above.
$\phi$ is determined from core data or from porosity measuring logs.

The oil saturation in those formations containing gas is given by:

$$S_o = 1 - S_w - S_g \qquad 14.$$

where values of $S_w$ and $S_g$ are obtained as taught above.

Equation (13) can be simplified to eliminate the term $\phi$ so that I do not need to know the porosity. As taught in Step VII above, I can obtain $\Sigma_{fs}$ which can be written as in equation (15).

$$\Sigma_{fs} = (1-\phi)\Sigma_r - \Sigma_w \phi S_w \quad 15.$$

Then we can assume $S_w = 1.0$.
I next combine equations 15 and 5.

$$\Sigma_{fs} = (1-\phi)[(\Sigma_{ff} - \phi\Sigma_{hc})/1 - \phi] + \Sigma_w \phi$$

$$\Sigma_{fs} = \Sigma_{ff} - \phi\Sigma_{hc} + \Sigma_w \phi$$

and get equation (16).

$$\phi = (\Sigma_{fs} - \Sigma_{ff})/(\Sigma_w - \Sigma_{hc}) \quad 16.$$

I then substitute the value of $\phi$ into equation (13) and obtain equation (17)

$$S_0 = 1 - S_g - \left[\frac{\Sigma_t - \Sigma_{ff}}{\Sigma_{fs} - \Sigma_{ff}} + \frac{\Sigma_{ho}S_g - \Sigma_g S_g}{\Sigma_w - \Sigma_{hc}}\right] \quad (17)$$

Comparison of logs can show which zones are more permeable

Attention is now directed to the drawing to show an arrangement of the logs for obtaining a determination of which intervals are the more permeable. This is a bonus of my system. In the drawing the ordinate represents depth of the well and the abscissa represents capture units. The depth shown is from 4,900 feet to total depth which is approximately 5,040 feet. The casing seat is at approximately 4,920 feet.

I have placed on the drawing three curves which I obtain in determining the saturation as described above. These are curves 10, 12 and 14 which represent $\Sigma_{fs}$, $\Sigma_t$ and $\Sigma_{ff}$ respectively which logs were fully described above. A comparison of log 10 or log 12 with log 14 shows the intervals having the highest permeability for the injected fluids. It can be seen that the log 10 has rather predominant peaks 16, 18 and 20 which shows intervals of relatively high permeability to the injected fluids at intervals indicated on the drawing.

Although the above description has been given in considerable detail, it is possible to make modifications in the procedure without departing from the spirit or scope of the invention.

I claim:

1. A method of measuring oil saturation in a subsurface zone penetrated by a well bore which comprises the steps of:
   a. running a thermal neutron decay device through said zone to obtain a base log $\Sigma_t$,
   b. displacing any water in said zone immediately surrounding the well bore with fresh water having a known capture cross section,
   c. running the thermal neutron decay log device as used in Step (a) to obtain a log $\Sigma_{ff}$,
   d. injecting a driving fluid to displace all the oil from the zone adjacent the well bore and filling the pore space of the log adjacent the well bore with water whose salinity is the same as the water in the formation at the time of Step (a),
   e. running the thermal neutron decay device of Step (a) to obtain a log $\Sigma_{fs}$,
   whereby logs $\Sigma_t$, $\Sigma_{ff}$ and $\Sigma_{fs}$ may be used to obtain a measure of the oil saturation in said subsurface zone.

2. A method as defined in claim 1 in which the driving fluid in Step (d) is in alcohol.

3. A metod as defined in claim 1 in which said driving fluid in Step (d) is a micellar solution having mutual solubility in oil and in water.

4. A method as defined in claim 1 in which the subsurface zone contains gas, the improvement which comprises, immediately after Step (a), obtaining a measure of gas saturation $S_g$.

5. A method as defined in claim 1 in which the fresh water injected in Step (b) has the same thermal neutron capture cross section as that of the oil in the zone.

6. A method as defined in claim 1 with a further improvement of using the logs $\Sigma_t$, $\Sigma_{ff}$ and $\Sigma_{fs}$ to determine relative permeability of the various intervals of the zone by placing the logs on a common chart having depth as the ordinate and capture units as the abscissa.

7. A method of measuring oil saturation in a subsurface zone penetrated by a well bore which comprises the steps of:
   a. running a thermal neutron decay device through said zone to obtain a base log $\Sigma_t$,
   b. displacing any water in said zone immediately surrounding the well bore with water having a thermal neutron capture cross section different from that of the formation oil,
   c. running the thermal neutron decay log device as used in Step (a) to obtain a log $\Sigma_{wf}$,
   d. injecting a driving fluid to displace all the oil from the zone adjacent the well bore and filling the pore space of the log adjacent the well bore with water whose salinity is the same as the water in the formation at the time of Step (a),
   e. running the thermal neutron decay device of Step (a) to obtain a log $\Sigma_{fs}$,
   whereby logs $\Sigma_t$, $\Sigma_{wf}$ and $\Sigma_{fs}$ may be used to obtain a measure of the oil saturation in said subsurface zone.

* * * * *